United States Patent Office 3,704,159
Patented Nov. 28, 1972

3,704,159
METHOD OF PROTECTING AND PRESERVING STONE OBJECTS
Edward Vale Sayre, Bellport, N.Y., assignor to New York University, New York, N.Y.
No Drawing. Continuation of abandoned application Ser. No. 860,012, Sept. 22, 1969. This application Apr. 30, 1971, Ser. No. 139,269
Int. Cl. C03c 17/00
U.S. Cl. 117—123 A     15 Claims

ABSTRACT OF THE DISCLOSURE

Process for preserving stone objects made of limestone, sandstone, or the like and containing at least 5 percent by weight of $CaCO_3$. Comprises contacting the stone with an aqueous solution of a barium or strontium salt of a monoester of sulfuric acid and then hydrolyzing at a pH not less than about 7, so as to precipitate barium or strontium sulfate in a slow, controlled manner and thereby effect consolidation of the stone.

CROSS-REFERENCE TO RELATED APPLICATION

This application is a continuation of application Ser. No. 860,012, filed Sept. 22, 1969, and now abandoned.

BACKGROUND OF THE INVENTION

(1) Field of the invention

This invention relates to a method of protecting, preserving and strengthening stone objects, particularly objects made of porous friable stone such as certain limestones, sandstones and the like, as well as similar stones rendered porous and friable due to deterioration. More particularly, the invention relates to a method of improving the resistance of such stone to attack by acidic atmospheric contaminants such as $SO_2$ and $CO_2$.

(2) Description of the prior art

From the very inception of modern research on methods for the preservation of stone, which dates roughly from the middle of the nineteenth century, it has been recognized that the disposition of insoluble barium or strontium salts on or in stone might serve to protect it. For example, it was recognized that a major factor in the deterioration of calcareous stone or stones whose particles were cemented together by means of calcium carbonate was the chemical transformation of insoluble calcium carbonate into relatively soluble calcium bicarbonate, bisulfite, sulfite and sulfate through the action of water combined with carbon dioxide and sulfur dioxide from the air. There are, of course, small concentrations of other acidic gases in the atmosphere which contribute in a more minor way to this type of deterioration. These chemical transformations not only result in the formation of relatively soluble calcium compounds, but also involve changes in crystal structure with accompanying pulverization of the bonding material and mechanical disruptions of the stone structure through swelling or shrinking of the altered internal material. All of this contributes to a general breakdown of the cohesive structure of the stone, causing it to become soft and friable. The presence of barium and strontium compounds within the stone will provide a degree of protection against such attack because they eventually become converted into sulfates which are both insoluble and inert toward the acidic atmospheric gases. As long as a deposit of barium or strontium sulfate effectively surrounds carbonate particles in the stone, it will inhibit the reaction of these particles with acidic substances.

Early attempts to preserve stone in this manner are described in a series of British patents granted during the last half of the nineteenth century. In 1856, Frederick Ransome was granted patent 2267 for "Improvement in the Manufacture of Artificial Stone and Rendering it and other Building Materials Less Liable to Decay," which described, among other processes, the application of solutions of barium salts to stones with the intent of converting soluble carbonates or sulfates within them into insoluble compounds. He also employed an alternate treatment of applications of aluminum sulfate and barium hydroxide in order to deposit "alumina and baryta" in the stone. In 1862, Arthur Herbert Church was granted patent 220 on "Improvement in the Means of Preserving Stone," which described the alternate application of solutions of silicic acid and barium or strontium hydroxide to stone. Frederick S. Barff was granted patent 1389 in 1893. This described the attachment of a layer of paste of barium sulfate and calcium carbonate upon stone surfaces by means of potassium silicate. Ransome was also granted patent 3279 in 1868 for processes involving treatment of stone with a solution of barium, strontium or calcium hydroxide followed by neutral solutions of soluble silicates. In 1884 patent 13,761 granted Maximilian Dennstedt described a process of saturating a porous stone with a hot solution of barium hydroxide, then allowing the treated stone to dry in an atmosphere of carbon dioxide. If necessary to fill the pores of stone completely with barium carbonate, he suggested repetition of the process. Dennstedt also proposed a surface brushing of stone with sulfuric or chromic acid followed by soaking in a saturated solution of barium or strontium hydroxide. This would, of course, result in the deposition of a surface layer of barium sulfate or chromate, with the eventual formation of barium carbonate in the stone beneath this layer.

Church continued to be concerned with stone preservation for nearly half a century. In a 1904 memorandum on the treatment of decayed stonework in the Chapter House, Westminster Abbey (J. Soc. Chem. Inc. 23, 824 (1904)), he recommended successive applications of a saturated solution of barium hydroxide. Drying in air, which, of course, contains carbon dioxide, between these applications of baryta solutions would evenutally result in an accumulation of barium carbonate within the stone, as in the Dennstedt process. This later process of simple treatment with barium hydroxide alone is what is most frequently referred to in the literature as the Church process.

All of the foregoing processes eventually were judged to be unsatisfactory and their use was largely abandoned. The most basic reason for their failure was that in all of them the final protecting material was deposited only in a relatively thin surface layer. The very insoluble barium sulfates, silicates or chromates would precipitate immediately at the interface where solutions of barium ions and the precipitating anions were brought into contact. This would normally be the stone surface. Moreover, because these precipitating compounds were so insoluble, they would come down in the form of very finely divided minute crystals that would not of themselves bond together into a cohesive structure. This latter phenomenon particularly typifies barium sulfate precipitation, inasmuch as barium sulfate is an unusually insoluble compound. Prior surface deterioration and the Dennstedt prior surface treatment with sulfuric acid would have produced only a surface layer of calcium sulfate which then would have been transformed in situ into barium sulfate upon treatment with a solution of barium hydroxide.

The treatments that involved saturation of the stone with barium hydroxide followed by prolonged exposure to carbon dioxide (Dennstedt's and Church's), if applied to a porous stone, might result in the deposition of barium carbonate to some depth within the stone. However, barium carbonate is itself not protective against acidic gases, for it reacts with them in the same way as does calcium carbonate. Carbon dioxide converts barium carbonate into barium bicarbonate, which is relatively soluble. The first reaction product of barium carbonate with aqueous sulfur dioxide is an equal molecular mixture of barium bicarbonate and barium bisulfite, which are also moderately soluble salts. Hence rain containing dissolved carbon dioxide and sulfur dioxide would dissolve and remove some barium carbonate, just as it would also dissolve and remove calcium carbonate. Eventually, however, a protective surface layer of barium sulfate might accumulate upon the barium carbonate impregnated stone.

Purely superficial layers of protecting substances upon stone, however, have nearly always eventually begun to exfoliate. The fact that their physical properties, such as thermal expansion, may be quite different from the stone upon which they rest, generally results in the setting up of forces that tend to detach them from the underlying body of stone. When broken, protective surfaces may be corrosively undercut. Also they may block the flow of water transporting dissolved salts from the stone interior, resulting in the deposition of efflorescent salts beneath the outer layer which would literally push the protecting layer from the stone. Thus, any merely surface layer will not provide prolonged protection for stone.

Lewin, in Belgian Patent 694,347, granted Aug. 21, 1967, has described a process for stone preservation involving, inter alia, treating the stone with an aqueous solution containing a barium or strontium salt. A compound capable of liberating carbon dioxide and ammonia, e.g., urea, may be added to the solution, whereupon barium or strontium carbonate will be precipitated within the stone.

Any process for the conservation of artistic and historic stone work requires that the protection be complete and long-lasting, i.e., deterioration must be fully arrested after treatment for a period of at least several years under average conditions. The treatment to which the stone is subjected must not substantially alter the appearance of the surface and the treatment desirably should be applicable in the field under average outdoor conditions and to objects in situ, whether large or small.

SUMMARY OF THE INVENTION

In accordance with my invention, I have found that a porous, friable stone containing at least 5 percent by weight of calcium carbonate, can be effectively consolidated and rendered resistant to the action of water, oxides of suulfur, oxides of carbon, and other atmospheric contaminants by treating the object with an aqueous solution of a barium or strontium salt of a monoester of sulfuric acid, followed by hydrolizing at a pH not less than about 7. The treatment with the barium or strontium salt solutions effects in depth impregnation of the stone. Controlled hydrolysis from a homogeneous solution results in precipitation and deposition of well formed, granular barium or strontium sulfate throughout all those regions wherein the previous salt solution had penetrated. This deposition of insoluble sulfate effects consolidation of the stone. Moreover, inasmuch as the sulfate is highly insoluble, the stone is rendered extremely resistant to attack by water, as well as to attack by atmospheric contaminants such as $SO_2$, $CO_2$, and the like.

Of course, my invention is applicable not only to stones that are relatively porous and friable, but also to stones that have undergone deterioration at and below the surface but which are fundamentally impervious and well compacted beneath the deteriorated region. An example of such a stone is a compact marble stone having a deteriorated surface layer. Thus, such stones generally will show relative porosity at those regions that have undergone decay. In treating such stones according to my invention, the treating solution penetrates to the depth of the deteriorated regions, and subsequent hydrolysis tends to deposit barium of strontium sulfate in those regions where the treating solution has penetrated. Accordingly, the resulting stone is consolidated and substantially impervious throughout.

Thus, by virtue of my invention, there is effected a slow, controlled precipitation of insoluble sulfate in depth within the stone structure that is desired to be preserved. The rate of this precipitation is controlled by the hydrolysis of water soluble barium or strontium salts. The process results in the filling of voids throughout the stone to the depth that the aqueous salt solution has penetrated, with relatively large crystals of the insoluble sulfate that bind the individual particles of the stone together into a hard cohesive structure. Because this newly deposited surrounding binding material is chemically inert toward the various acidic gases prevalent in our contaminated atmosphere, its presence throughout the stone structure will protect the stone against the corrosive action of these gases.

DESCRIPTION OF THE PREFERRED EMBODIMENTS

As previously noted, my invention involves treatment of stone containing at least 5 percent calcium carbonate with an aqueous solution of a barium or strontium salt of a monoester of sulfuric acid.

The barium or strontium monoester of sulfuric acid generally may be represented by the formula:

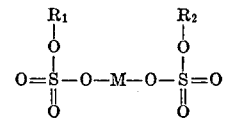

wherein M stands for barium or strontium; and $R_1$ and $R_2$ may each be alkyl, including linear and branched alkyl, the alkyl group desirably containing from 1 to 12 carbon atoms; substituted alkyl; aryl, e.g., a nucleus of the phenyl or naphthyl series or the like; aralkyl, e.g., benzyl; alkaryl, e.g., tolyl; or oxa-alkyl, that is to say, wherein there are one or more ether bridges present, e.g., 2-oxa-butyl $(CH_3—O—CH_2—CH_2—)$ 3,6-dioxaoctyl $(CH_3—CH_2—O—CH_2—CH_2—O—CH_2—CH_2—)$ and the like. When $R_1$ and/or $R_2$ is oxa-alkyl, the number of carbon atoms present is desirably from about 2 to 20.

As noted, where $R_1$ and/or $R_2$ are unsubstituted alkyl, it is desirable that the alkyl group contain from about 1 to 12 carbon atoms. Alkyl groups having more than 12 carbon atoms tend to result in a salt having inadequate water solubility. Preferably, the alkyl group will contain from about 1 to 4 carbon atoms, i.e., methyl, ethyl, n-propyl, isopropyl, n-butyl, isobutyl, and t-butyl. The barium and strontium diethyl sulfates are particularly suitable.

It frequently is desirable that $R_1$ and/or $R_2$ be substituted alkyl, wherein the substituent is of the type that will enhance the water solubility of the salt. Thus, suitable substituents for this purpose include —OH, —$NH_2$, —COOH, —$SO_3H$, —CHO, =O, —OR wherein R is alkyl, and the like. (Reference to =O as a suitable substituent is intended to designate the presence of a carbonyl group,

in the alkyl chain. Stated another way, one or more of the carbons in the alkyl chain may be a carbonyl carbon.) The use of alkyl groups containing such a substituent permits one to utilize substituted alkyl groups containing more than 12 carbon atoms. Thus, substituted alkyl groups containing from about 1 to 18 carbon atoms, or even higher, can be employed. Of course, where $R_1$ and/or $R_2$ are substituted alkyl, the substituents need not necessarily be those for enhancing water solubility that were previously enumerated. Thus, other substituents that may be present include, e.g., —N=O, —NO$_2$, halogen, and the like. Such substituents do not, however, appreciably enhance the water solubility of the salt so that ordinarily there is no particular advantage to their being present.

It is to be noted that when $R_1$ and/or $R_2$ is an oxaalkyl substituent, one or more of the carbon atoms present in such substituent may be substituted. Thus, the substituents may be of the type that will enhance the water solubility of the salt or of the type that do not appreciably enhance its water solubility. Hence, it is to be understood that the preceding discussion of substituents for $R_1$ and/or $R_2$ being substituted alkyl is also applicable to $R_1$ and/or $R_2$ being substituted oxa-alkyl.

As noted, $R_1$ and/or $R_2$ may also be aryl, or substituted aryl, as of the phenyl or naphthyl series. Where a substituted aryl is employed, the substituents may be any of those previously indicated in connection with the description of $R_1$ and/or $R_2$ being substituted alkyl. Particularly desirable salts include the barium and strontium phenyl sulfates.

It is important to note that the aqueous solution of the barium or strontium salt need not consist solely of water as the solvent. Thus, it frequently may be advantageous to employ as the solvent a mixture of water and an organic solvent that is miscible therewith. Suitable organic solvents include alcohols such as, e.g., ethanol, propanol, etc.; ketones such as, e.g., acetone, methyl ethyl ketone, etc.; aldehydes such as, e.g., acetaldehyde and the like; ethers such as, e.g., diethyl ether, etc.

The concentration of the barium or strontium salt of the sulfuric acid monoester (hereinafter sometimes referred to merely as the barium or strontium salt) in the aqueous solution may vary within wide limits. Generally it is preferred that the concentration of the salt be at least 0.1 gram per 100 milliliters of solution, a more preferred range being at least about 4 g./100 ml. The upper limit as to concentration is simply the concentration of the saturated salt solution.

It is to be recognized that the particular nature of the barium or strontium salt of the sulfuric acid monoester is not critical. Stated another way, the specific nature of the organic group bonded to the oxygen atom is not critical, so long as the salt exhibits the requisite solubility, i.e., at least 0.1 gram per 100 milliliters of solution, or preferably, at least 4 grams per 100 milliliters of solution.

The stone object to be preserved is then treated with the foregoing aqueous salt solution. The treatment may be in any manner that is convenient. However, it is highly desirable that the stone object be maintained in a moist condition. Thus, the mere application to the stone object of the salt solution followed immediately by drying would generally result in the deposition of only partially hydrolized monoester, which might be subject to leaching from the stone before being completely converted to an insoluble sulfate. The sulfate that eventually would be formed from the hydrolysis of this residual monoester probably would be fine grained and hence would not contribute greatly to the cohesive structure of the treated stone.

However, any method of application of the aqueous salt solution which (1) permits saturation of the stone to a reasonable depth and (2) retains the solvent water within the pores of the stone during the period of hydrolysis is adequate. Where a porous friable stone is being treated, the depth of penetration of the aqueous salt solution advantageously is at least about one centimeter. For a well compacted stone that is essentially impervious, save for those regions at and near the surface that have undergone deterioration, the depth of penetration is desirably coextensive with the depth of surface deterioration.

Suitable methods of applying the aqueous salt solution include immersion of the stone in the salt solution, or washing, brushing or spraying the stone surface with a sufficient quantity of the salt solution for a sufficient time to permit the solution to soak well into the stone, followed by the application of a cover, temporary sealant or humectant adequate to restrict evaporation from the stone surface during the period of hydrolysis. Suitable humectants include glycols such as ethylene glycol, glycerine, and the like; sugars, such as sucrose or glucose, and other humectants commonly employed in the art. Alternatively, the stone object may be maintained in a controlled humid atmosphere after application of the aqueous salt solution. The relative humidity should, of course, be maintained as high as possible, with 100% relative humidity being preferred.

The temperature at which the solution is maintained may vary from ambient temperature, e.g., room temperature, up to the boiling point of the solution. Preferably the temperature is from about 50 to 100° C.

The period of immersion is roughly inversely proportional to the temperature of the solution. For instance, when the treatment is carried out at the boiling point of the aqueous salt solution, the time required for treatment may be as little as 15 minutes or half an hour, whereas when the treatment is carried out at room temperature the time of treatment generally will be measured in days. The hydrolysis of monesters without an excess of base being present can result in the formation of acidic solutions which can attack the calcium carbonate present in the stone. Hence the pH of the treating solution must be maintained at a value of 7 or greater. This control can be achieved most simply through the addition of base in excess of the amount required to react with the acid so formed. While this base may be any common alkali such as sodium hydroxide, ammonium hydroxide, etc., I have found it most desirable to employ barium or strontium hydroxide, since the use of these bases does not introduce extraneous ions in the solution. One could, of course, control the pH of the solution to a specific value during the course of the hydrolysis through continuous addition of base; however, a simple addition of an excess of base at the beginning of the reaction suffices.

The aqueous solution of a barium or strontium salt of a monoester of sulfuric acid can be prepared from a number of different salts of various monoester sulfates. A variety of soluble compounds of barium or strontium and a number of different bases could also be employed. Thus, a typical solution for treating stone might contain six grams of barium ethylsulfate monohydrate and five grams of barium hydroxide octahydrate per one hundred grams of water. In such a solution the molar concentration of barium hydroxide would be slightly greater than that of the molar concentration of barium ethyl sulfate. Thus a slight excess of barium hydroxide would remain in solution after all of the monoester had reacted with it and the stone at no time during the treatment would be exposed to acidic conditions.

The foregoing treating solution may, if desired, be prepared directly from the corresponding diesters of sulfuric acid, the diesters being commercially more readily available and much less expensive than the salts of the monoesters. Diester sulfates tend to be oily liquids which are immiscible in water. The first hydrolysis, which converts the di- to the monoester, occurs relatively rapidly in the presence of a base, upon moderate heating of the solutions. I have readily obtained an effective solution for my treatment by adding several grams of diethyl sulfate per one hundred milliliters of water to an aqueous solution of barium hydroxide which contained just under the quantity of hydroxide that would react fully with the diester in its conversion. Upon heating and stirring, the solution clarifies in a matter of some minutes as the diethyl sulfate goes into solution upon reaction. At the end point of this reaction the solution suddenly becomes acidic due to there having been present a slight excess of the diester which now has been transformed into the monoester sulfuric acid. Addition of this solution of an approximate quantity of additional barium hydroxide to be slightly in excess of the amount that would react during the hydrolysis of the monoester to sulfate results in a suitable salt solution for my treatment.

One embodiment of my stone treatment is to leave the stone totally immersed in the aqueous salt solution for a suitable period, e.g., perhaps several weeks at room temperature, a day or more at 50° C., for a portion of a day at 75° C., or for an hour at 100° C. Following such treatment, an initially soft, friable, porous limestone will have been converted in depth into a hard, well consolidated stone into whose voids have been deposited barium sulfate of a relatively large granular size. Specifically, blocks of porous limestone whose least dimensions were several centimeters were found, after my treatment, to have been hardened throughout. Electron microbeam scanning of cross sections of these blocks showed the deposition of barium sulfate to have extended completely throughout the blocks, including their most central regions.

From the foregoing, it will be seen that my process is characterized by (1) the direct deposition of sulfates which are themselves chemically inert and insoluble, and hence which immediately provide protection against acidic attack, (2) the slow controlled precipitation of these protective sulfates from a homogeneous solution in such a way that relatively large cohesively interlocked crystals of these insoluble sulfates are formed which bond the stone structure providing it with strength and hardness, and (3) causing this precipitation to occur in depth throughout all regions of the stone capable of being penetrated by the treating solution, thus specifically avoiding the formation of a relatively thin, fine-grained sulfate surface layer that has characterized treatments previously proposed.

The following examples will further illustrate my invention. All parts are by weight unless otherwise stated.

EXAMPLE 1

29.2 grams of diethyl sulfate were reacted with 24 grams of strontium hydroxide octahydrate in 275 milliliters of water until the pH was acidic, thereby forming the monoester salt. Then 27 additional grams of strontium hydroxide octahydrate dissolved in 125 milliliters of boiling water were added, thus providing an approximately 10 percent excess of $Sr(OH)_2$ so as to insure an alkaline pH.

The foregoing treating solution was brought to its boiling point in a closed container provided with a small vent for the evolved steam. Four specimens of Norion limestone, each weighing about 15 grams, were immersed in the boiling solution for about one hour. The samples were then removed, washed, and dried at 50° C. to constant weight. All of the samples, which initially were soft and poorly consolidated, had been transformed into a firm, hard and well-consolidated state. The average weight gain of consolidating material was 4.7±0.2%.

EXAMPLE 2

An aqueous solution was prepared containing 10 grams of barium ethyl sulfate dihydrate $[Ba(C_2H_5SO_4)_2 \cdot 2H_2O]$ and 5 grams of barium hydroxide monohydrate $$[Ba(OH)_2 \cdot H_2O]$$

per 100 milliliters of solution.

A sample of soft porous Norion limestone similar to that employed in Example 1 was then placed in the above solution at its boiling temperature for one half hour. The sample was then removed and dried. It was found to be hard and well consolidated.

EXAMPLES 3–4

An aqueous solution was prepared as described in Example 2, however such that the solution contained, per 100 milliliters thereof, 4.5 g. of $Ba(C_2H_5SO_4)_2 \cdot 2H_2O$ and 2.25 g. of $Ba(OH)_2 \cdot H_2O$. Thus, as in Example 2, the barium hydroxide was present in an excess of about 10 percent so as to provide an alkaline pH. The solution was added to a closed reaction vessel (Example 3) and distilled water was added to a similar reaction vessel ("control" Example 4). Four samples of Norion limestone of the type employed in Example 1 and each weighing about 20 grams were added to the vessel containing the salt solution, followed by heating to about 60° C. and maintaining the 60° C. temperature for about 17 hours. Two similar samples were added to the vessel containing distilled water, followed by heating to about 60° C. and maintaining this temperature for about 17 hours. The samples were then removed and dried to constant weight. The four samples of Example 3 showed a weight gain of 3.6±0.3%, indicating deposition of and impregnation with barium sulfate. The control samples of Example 4 showed a weight loss of 0.5±0.1%, indicating dissolution and removal of calcium carbonate and other salts. As in the preceding samples, the treated sample of Example 3 was hard and well consolidated.

EXAMPLES 5–6

An aqueous solution was prepared as described in Example 2, however at a much more dilute concentration. Thus the solution contained, per 100 milliliters thereof, 0.25 g. of $Ba(C_2H_5SO_4)_2 \cdot 2H_2O$ and 0.125 g. of $$Ba(OH)_2 \cdot H_2O$$

(approximately 10 percent excess barium hydroxide). The solution was added to two reaction vessels equipped with stoppers. A 20 gram sample of Norion limestone of the type employed in Example 1 was added to each beaker, and this was followed by heating at 60° C. for about 17 hours. The samples were removed and dried to constant weight. Each showed excellent consolidation and hardening.

EXAMPLE 7

This example was similar to Example 3, except that the treatment was carried out on Caen limestone at room temperature for one month. The sample was then removed from the treating solution, washed, and dried. The thus treated sample was hard, and well consolidated. The sample was then immersed in concentrated (6 N) nitric acid until all effervescence from the sample had ceased. Notwithstanding this extremely drastic exposure, and although the acid dissolved out all soluble carbonate, the sample still retained its external configuration and form stability. Similar immersion in acid of the untreated stone resulted in its complete disintegration.

EXAMPLES 8–9

A sample of soft porous Caen limestone similar to that employed in the previous example was consolidated by means of an aqueous salt solution as described in Example 3. This sample and an untreated control sample were then immersed in a bath of water through which a stream of sulfur dioxide was continuously bubbled for a period of about 17 hours. The samples were then removed and examined. That sample treated in accordance with my invention (Example 8) showed only slight softening of the surface as a result of the foregoing conditions, on exposure to sulfurous acid. By contrast, the "control" sample (Example 9) had been etched to a depth of several millimeters.

EXAMPLE 10

A solution of barium methyl sulfate was prepared by heating 23.8 grams of dimethyl sulfate and 17.0 grams of barium hydroxide monohydrate with 400 milliliters of water until an acidic pH was achieved, indicating completion of hydrolysis to the monoester. 19.3 additional grams of barium hydroxide monohydrate was dissolved in this solution which was brought to boiling temperature in a vented enclosed vessel. Three pieces of soft Dover chalk and one piece of Norion limestone were immersed in this solution for a period of one hour, washed and dried to constant weight. The stones had been hardened and rendered firm and well consolidated, the Dover chalk achieving the appearance of marble. The mean weight gain of the chalk specimens was 4.3%, and of the Norion limestone, 4.1%.

I claim:

1. A method of preserving stone containing at least 5 percent by weight of calcium carbonate, this method comprising contacting the stone with an aqueous solution of a barium or strontium salt of a monoester of sulfuric acid and penetrating porous regions in said stone with said solution, the concentration of said salt in said solution being at least 0.1 gram per 100 milliliters of solution, hydrolizing said salt at a pH not less than about 7, and slowly precipitating insoluble sulfate in those regions wherein said solution has penetrated, to thereby effect consolidation and hardening of the stone.

2. The method of claim 1 wherein the concentration of said salt in said solution is at least 4 grams per 100 milliliters of solution.

3. The method of claim 1 wherein said salt is of the formula

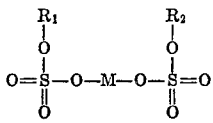

wherein M stands for barium or strontium, and wherein $R_1$ and $R_2$ are each alkyl, aryl, oxa-alkyl, substituted alkyl, substituted oxa-alkyl, or substituted aryl, wherein the substituent is —OH, —$NH_2$, —COOH, —$SO_3H$, =O, or —OR wherein R is alkyl.

4. The method of claim 3 wherein $R_1$ and $R_2$ are alkyl containing from 1 to 12 carbon atoms.

5. The method of claim 4 wherein $R_1$ and $R_2$ are alkyl containing from 1 to 4 carbon atoms.

6. The method of claim 5 wherein barium ethyl sulfate is employed.

7. The method of claim 1 wherein said contacting step is carried out at a temperature of from about ambient temperature to the boiling point of the solution.

8. The method of claim 7 wherein said temperature is from about 50 to 100° C.

9. The method of claim 1 wherein said contacting is effected by immersing said stone in said aqueous salt solution.

10. The method of claim 1 wherein said contacting is effected by washing the stone surface with said aqueous salt solution followed by maintaining said stone in a condition whereby evaporation of said salt solution therefrom during hydrolysis is restricted.

11. The method of claim 1 wherein said pH is maintained at at least about 7 by the presence of an alkaline material in said aqueous salt solution.

12. The method of claim 11 wherein said alkaline material is an alkali metal hydroxide, ammonium hydroxide, or a metal hydroxide wherein the metal is from Group II of the Periodic Table.

13. The method of claim 12 wherein the alkaline material is either barium hydroxide or strontium hydroxide, barium hydroxide being present when the salt is a barium monoester of sulfuric acid, and strontium hydroxide being present when the salt is a strontium monoester of sulfuric acid.

14. The method of claim 1 wherein said stone is a limestone.

15. The product of the process of claim 1.

References Cited

UNITED STATES PATENTS

| | | | |
|---|---|---|---|
| 2,114,692 | 4/1938 | Ward et al. | 117—123 A |
| 2,169,458 | 8/1939 | Bent et al. | 166—294 |

EDWARD G. WHITBY, Primary Examiner

U.S. Cl. X.R.

117—169 R, DIG. 3